(12) United States Patent
Oknestam et al.

(10) Patent No.: US 7,553,114 B2
(45) Date of Patent: Jun. 30, 2009

(54) THREAD CUTTING TAP AND A METHOD OF ITS MANUFACTURE

(75) Inventors: Markus Oknestam, Haverdal (SE); Stefan Zivkovic, Halmstad (SE)

(73) Assignee: Sandvik Intellectual Property AB, Sandviken (SE)

( * ) Notice: Subject to any disclaimer, the term of this patent is extended or adjusted under 35 U.S.C. 154(b) by 575 days.

(21) Appl. No.: 10/476,417

(22) PCT Filed: Apr. 29, 2002

(86) PCT No.: PCT/SE02/00837

§ 371 (c)(1),
(2), (4) Date: Apr. 12, 2004

(87) PCT Pub. No.: WO02/087813

PCT Pub. Date: Nov. 7, 2002

(65) Prior Publication Data

US 2006/0216124 A1    Sep. 28, 2006

(30) Foreign Application Priority Data

Apr. 30, 2001  (SE) ................................. 0101512

(51) Int. Cl.
*B23G 5/06* (2006.01)
(52) U.S. Cl. ................... 408/222; 408/230; 470/198
(58) Field of Classification Search .............. 408/59, 408/222, 230; 470/198; *B23G 5/06*
See application file for complete search history.

(56) References Cited

U.S. PATENT DOCUMENTS

| 250,134 | A | * | 11/1881 | Coy | 408/1 R |
|---|---|---|---|---|---|
| 1,345,425 | A | * | 7/1920 | Wells | 408/219 |
| 2,121,380 | A | | 6/1938 | Bath | |
| 2,145,819 | A | * | 1/1939 | Swenson | 408/222 |
| 3,945,069 | A | * | 3/1976 | Cecil | 470/198 |
| 4,708,542 | A | | 11/1987 | Emanuelli | |
| 4,761,844 | A | * | 8/1988 | Turchan | 470/199 |
| 5,413,438 | A | * | 5/1995 | Turchan | 409/66 |
| 6,012,882 | A | * | 1/2000 | Turchan | 409/74 |
| 6,179,528 | B1 | * | 1/2001 | Wardell | 407/54 |
| 6,213,692 | B1 | * | 4/2001 | Guehring et al. | 408/144 |

FOREIGN PATENT DOCUMENTS

DE    23 31 927    1/1975

(Continued)

*Primary Examiner*—David P Bryant
*Assistant Examiner*—Eric A. Gates
(74) *Attorney, Agent, or Firm*—Drinker Biddle & Reath LLP

(57) ABSTRACT

A thread cutting tap having a threaded portion for cutting out a thread in a wall of a workpiece opening into which the threaded portion is to be introduced. The threaded portion is provided with at least two cutting edges extending in a circumferential direction of the body. Each cutting edge is an integral peripheral part of a flank portion extending substantially radially from the body. The flank portions define between one another a chip removal flute extending in the longitudinal extension of the body for removal of chips. At least one of the flank portions has a side wall divided into a pair of elongated concave surfaces separated by an elongated ridge constituting a chip-breaking member. The chip removal flutes are at least partly helically shaped.

22 Claims, 4 Drawing Sheets

FOREIGN PATENT DOCUMENTS

Figure 1A:
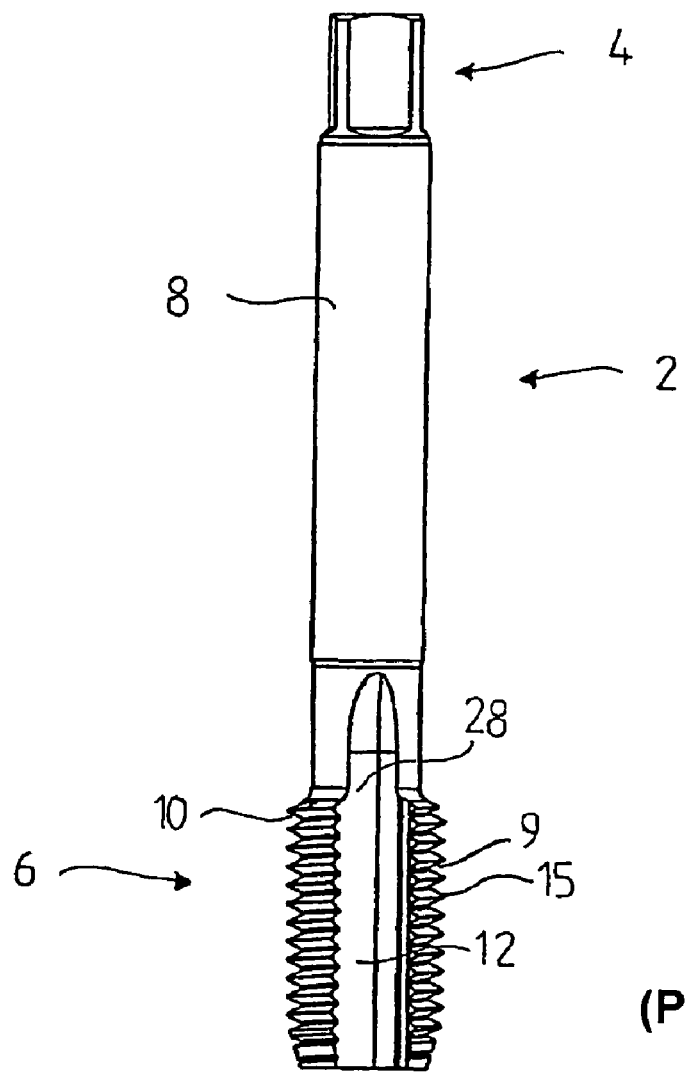

| | | |
|---|---|---|
| DE | 40 19 427 | 1/1992 |
| EP | 0 122 176 | 10/1984 |
| EP | 0 264 822 | 4/1988 |
| EP | 0 641 620 | 3/1995 |
| EP | 0 953 396 | 11/1999 |
| JP | 61-136725 | 6/1986 |
| JP | 61-136726 | 6/1986 |
| JP | 1-171725 | 7/1989 |
| JP | 2-100819 | 4/1990 |
| JP | 2-180524 | 7/1990 |
| JP | 5-138439 | 6/1993 |
| JP | 7-60546 | 3/1995 |
| JP | 07164247 A * | 6/1995 |
| JP | 11019825 A * | 1/1999 |
| JP | 2006181652 A * | 7/2006 |
| SU | 1 039 661 | 9/1983 |
| WO | WO 9630148 A1 * | 10/1996 |
| WO | WO 9846388 A1 * | 10/1998 |

* cited by examiner

THREAD CUTTING TAP AND A METHOD OF ITS MANUFACTURE

TECHNICAL BACKGROUND OF THE INVENTION

The present invention relates to a thread cutting tap having an elongated body, comprising at a first end a connector portion adapted to be connected to a tool and at a second end a threaded portion for cutting out a thread in a wall of an opening into which said threaded portion is to be introduced, said threaded portion being provided with at least two cutting edges in the circumferential direction of said body, each of said cutting edges being an integral peripheral part of a flank portion extending substantially radially from the longitudinal extension of said body, said flank portions defining therebetween a chip removal flute in the longitudinal extension of said body for removal of chips cut from said wall, wherein at least one of said flank portions having a side-wall is provided with a chip-breaking member.

It also relates to a method of manufacturing such a thread cutting tap.

A thread cutting tap of this kind is known from Swenson U.S. Pat. No. 2,145,819. The therein described cutting tap has straight chip removal flutes. Such flutes are disadvantageous, since the transportation of chips is poor, risking to cause accumulation of chips in the flutes. It also suffers from the drawback that it can only be used at relatively low cutting speeds.

Other thread cutting taps are known from JP-A-61-136726 and JP-A-61-136725, according to which the chip-breaking member is an indentation of a surface of the flank portion. The chip-breaking member in the form of an indentation is however disadvantageous, because it is only applicable to straight flute taps, as machining of the flank portion for achieving the chip-breaking member is complicated. The document also only relates to thread cutting taps of larger diameters, as there must be space both for introduction of a lubricant and transportation of the chips through a central opening.

Another thread cutting tap provided with chip-breaking members is known from SU-A-1 039 661. The chip-breaking members described in that document are not arranged on a surface of the flank portions.

SUMMARY OF THE INVENTION

It is therefore the object of the invention to provide a thread cutting tap, having improved chip handling properties.

This object has been achieved by a thread-cutting tap the initially defined kind, wherein said chip removal flutes are at least partly helically shaped.

It has also been achieved by a method of the initially defined kind, including forming said chip removal flutes to an at least partly helical shape.

Hereby is achieved a thread cutting tap which can be used at high cutting speeds without entangling or accumulation of chips.

Suitably, the elongated ridge is an edge formed by the immediate interconnection of said concave surfaces. Hereby, a sharp and well-defined chip-breaking member is achieved, which allows for a controlled chip-breaking.

Alternatively, the elongated ridge is formed by a convex surface.

Preferably, at least said surface is coated by a friction reducing coating. Hereby, the transport of the chips is improved. Furthermore, the wear resistance is increased.

Suitably said coating contains a nitride. In particular said coating is anyone of TiN, TiCN, TiAlN, TiAlCN and CrN. Hereby, a hard surface is achieved.

Advantageously, said chip removal flutes are helically shaped over substantially their whole length.

Preferably, the angle between the axial extension of the body and the extension of each of said chip removal flutes is 10°-50°, in particular 10°-25°.

Hereby is achieved a thread cutting tap suitable for forming threads in blind holes at high speeds, since the chips will be transported in the chip removal flutes away from the blind hole, i.e. towards the connector portion of the thread cutting tap.

Alternatively, said chip removal flutes are partly straight and partly helically shaped, said helically shaped flutes being arranged closest to the second end.

Suitably the angle between the axial extension of the body and the extension of each of chip removal flutes is 1°-15°.

Hereby is achieved a thread cutting tap suitable for forming threads in through holes at high speeds, since the chips will be transported in the chip removal flutes away from the through hole, i.e. away from the thread cutting tap.

DRAWING SUMMARY

The objects and advantages of the invention will become apparent from the following detailed description of preferred embodiments thereof in connection with the accompanying drawing in which like numerals designate like elements.

Figure 1B:
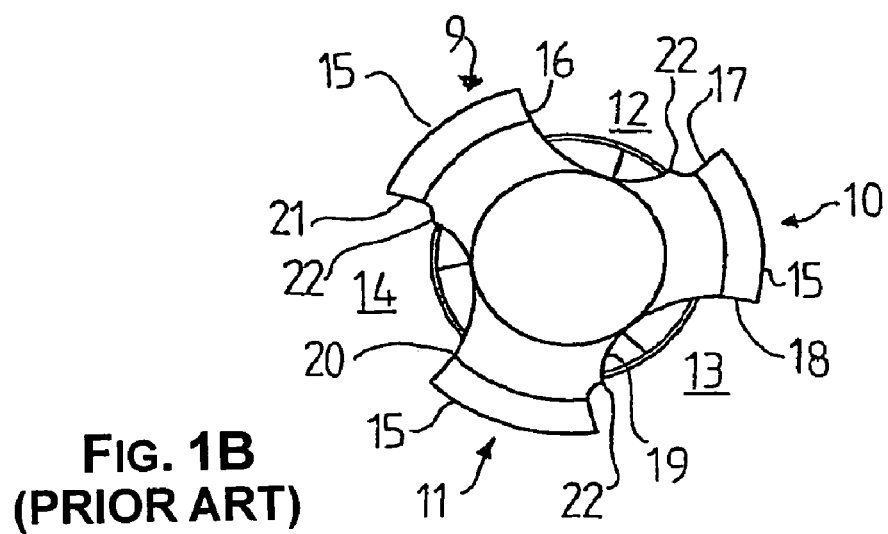
Figure 2A:
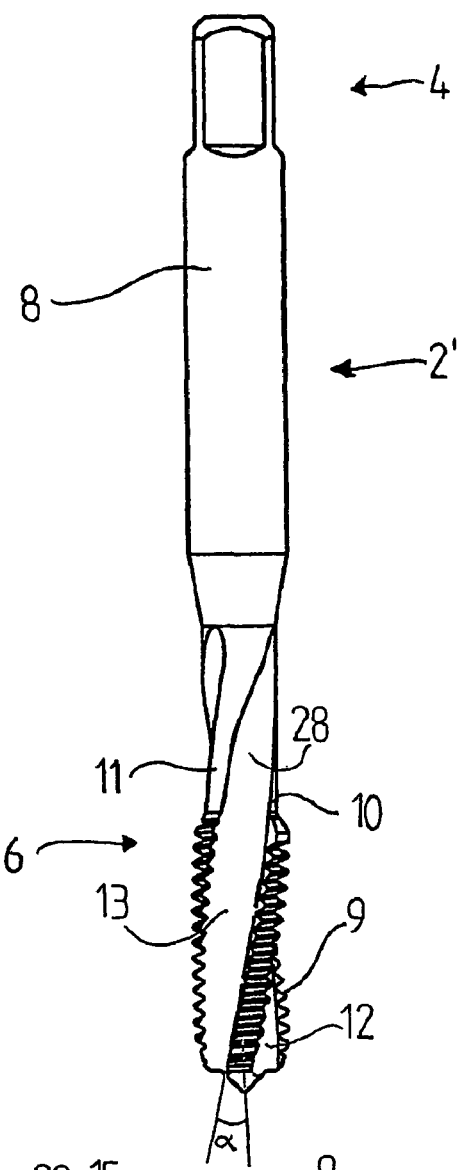
Figure 2B:
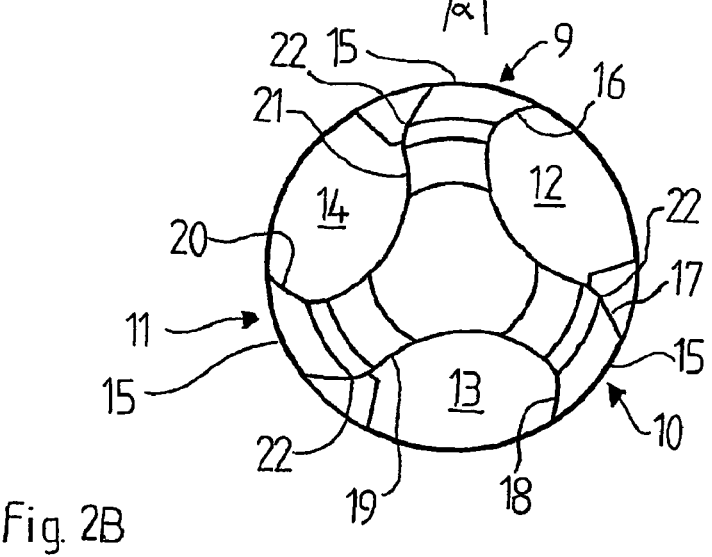
Figure 3A:
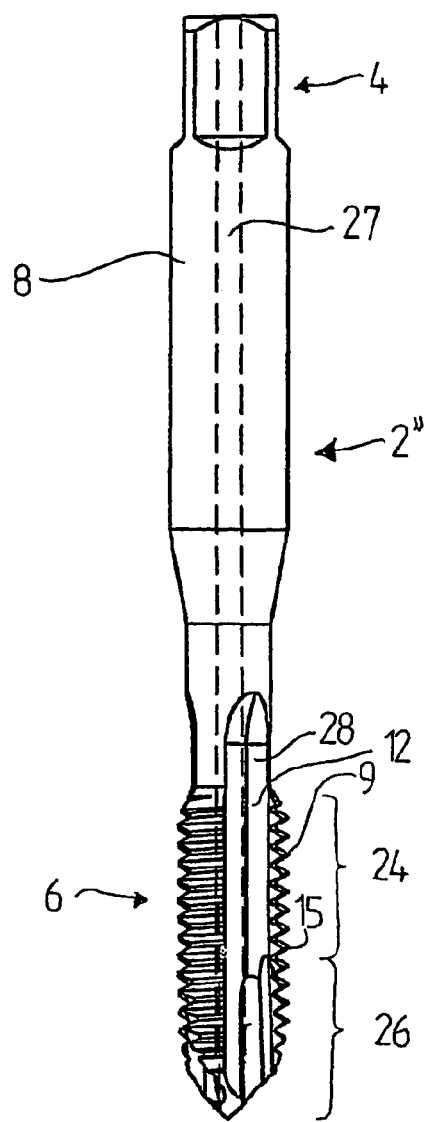
Figure 3B:
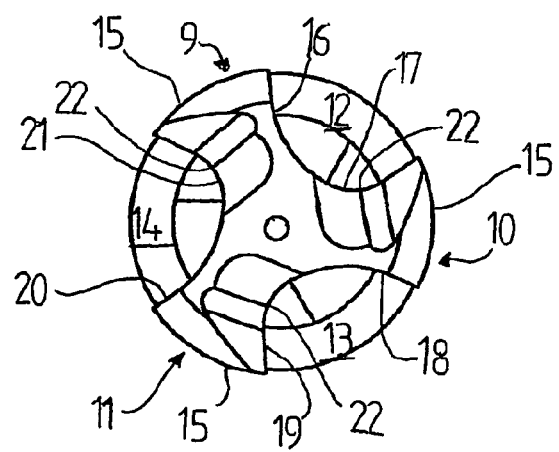
Figure 4:
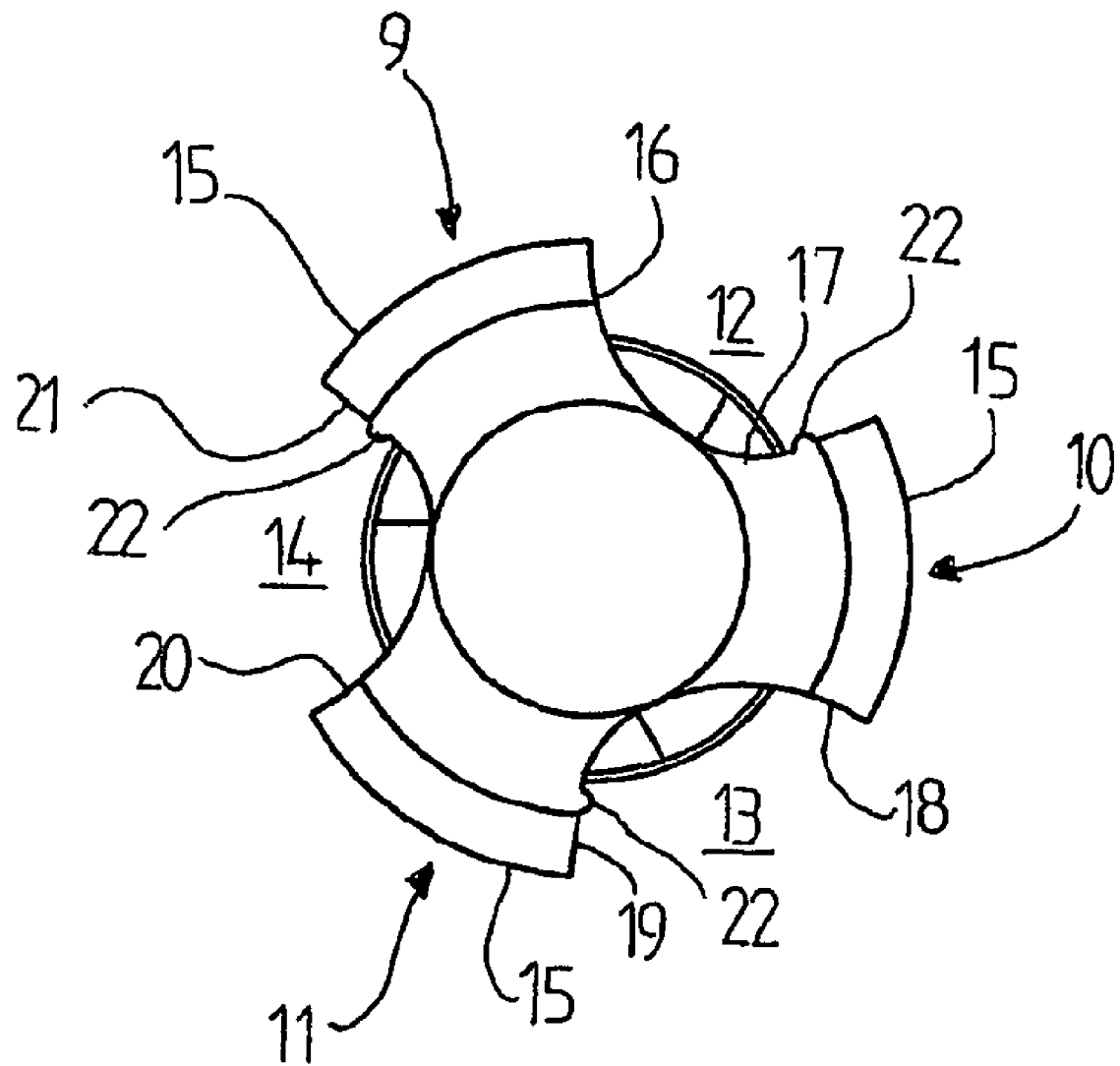

FIG. 1A illustrates a prior art thread cutting tap provided with a chip-breaking member, FIG. 1B is a bottom view of the thread cutting tap shown in FIG. 1A, FIG. 2A illustrates a thread cutting tap according to a first embodiment of the invention, FIG. 2B is a bottom view of the thread cutting tap shown in FIG. 2A, FIG. 3A illustrates a thread cutting tap according to a second embodiment of the invention, FIG. 3B is a bottom view of the thread cutting tap shown in FIG. 3A, and FIG. 4 illustrates a bottom view of a thread cutting tap provided with an alternative chip-breaking member.

DETAILED DESCRIPTION OF PREFERRED EMBODIMENTS OF THE INVENTION

FIG. 1A is a side elevation of a prior art straight fluted tap 2 comprising an elongated body having a connector portion 4, a threaded portion 6 and an intermediate portion 8. The threaded portion has, in the longitudinal direction of the body, three flanks 9, 10, 11 (FIG. 1B) divided by three straight flutes 12, 13, 14. The peripheral part of the flanks 10 is provided with cutting edges 15. The cutting edges 15 divided by the flutes 12, 13, 14 form together a virtual continuous helical thread. The flute 12 is defined by a side-wall 16 of the flank 9 and a side-wall 17 of the flank 10, the side-wall 17 being interconnected to the side-wall 16. Likewise, the flute 13 is defined by a side-wall 18 of the flank 10 and a side-wall 19 of the flank 11 and the flute 14 is defined by a side-wall 20 of the flank 11 and a side-wall 21 of the flank 9. Furthermore, the side-walls 18 and 19, and the side-walls 20 and 21 are interconnected, respectively.

Each of the side-walls 16, 18 and 20 has an elongated concave surface, whereas each of the side-walls 17, 19 and 21 has a pair of elongated concave surfaces divided by an elongated ridge 22 in the form of an edge.

Straight fluted taps are suitable for forming threads in through holes as well as in blind holes. The chips may be transported in both directions of the longitudinal extension of the flutes. There is however a risk for accumulation of chips in the flutes.

FIG. 2A is a side elevation of a helically fluted tap 2' (also called spiral fluted tap). Such a tap is provided with helical flanks 9, 10, 11 having side-walls 16, 17 and 18, 19 and 20, 21, respectively, defining helical flutes 12, 13, 14 (FIG. 2B).

In FIG. 2A, the angle between the axial extension and the extension of the helical flute, the so-called flute angle, is denoted by $\alpha$. The flute angle is preferably between 10° and 50°. The best results are however achieved with a flute angle between 10° and 25°.

Also in this embodiment, each of the side-walls 16, 18 and 20 has an elongated concave surface, and each of the side-walls 17, 19 and 21 has a pair of elongated concave surfaces divided by an elongated ridge 22 in the form of an edge.

Helically fluted taps are suitable for forming threads in blind holes, as chips will be transported in the flutes in a direction towards the connector portion, i.e. away from the blind hole.

FIG. 3A is a side elevation of an angularly pointed tap 2" (also called spiral point tap). Such a tap has threaded portion 6 divided into a straight portion 24 and an angular portion 26. The straight portion has straight flanks 9, 10, 11 having between them straight flutes 12, 13, 14, respectively. In the angular portion 26, the flanks 9, 10, 11 and the flutes 12, 13, 14 are formed angularly in relation to the straight flutes, i.e. angularly in relation to the longitudinal extension of the body.

Also in this embodiment, the side-walls 17, 19 and 21 has a pair of elongated concave surfaces divided by an elongated ridge 22 in the form of an edge. Each edge follows the longitudinal extension form of the flanks and the flutes. The edge is thus straight in the straight portion 24 and angular in relation to the longitudinal extension of the body.

Angularly pointed taps are particularly suitable for forming threads in. through holes, as chips will be transported in the flutes in a direction away from the tap, away from the through hole. In this embodiment the flute angle is preferably between 1° and 15° for best performance.

The tap of FIG. 3A is also provided with a lumen 27 for supply of a coolant fluid to the hole where a thread is to be formed. Such a fluid may be compressed air or an emulsion of oil and water or oil and air.

In FIG. 4 is shown an alternative chip breaking member. Instead of an edge between the concave surfaces, a convex surface forming a ridge 22 is provided for interconnection thereof.

In all the above described embodiments, the surface of the side-walls 16-21 defining the flutes 12-14 is provided with a coating 28 containing a nitride, such as TiCN, TiN, TiAlN, TiAlCN or CrN. The coating reduces the friction of the surface and also increases the hardness and the wear resistance thereof.

It should be noted that according to the invention, the described coating is not necessary. Tests have however proven that the form of the chips caused by machining by means of thread cutting taps provided with prior art chip breaking members will take quite different forms, depending on whether the surface of the flute is coated or not. Accordingly, chips will be longer, causing risk for entangling in the flutes.

However, the thread cutting tap described in FIGS. 1-4 provided with the chip breaking members according to the invention and having the walls defining the flutes coated by such a friction reducing coating has proven to create chips of such small sizes, that entangling of the chips is prevented.

As is known from Emanuelli U.S. Pat. No. 4,708,542, the threads of a tap may be provided with a friction reducing coating for reducing the friction while cutting the threads. However, the chip flutes of that tap are not provided with a coating.

It should also be noted that the taps described in connection with FIGS. 2A, 2B and 4 may be provide with a lumen for supply of a fluid. Furthermore, the number of flanks and flutes, respectively, may be more or less than three.

A piece of metal is provided with a through hole or a blind hole, either by drilling or by molding. In order to cut threads therein, a thread cutting tap according to the invention and having a general diameter slightly larger than the hole is used. The tap is rotated about its longitudinal axis while applying some pressure thereon, such that it cuts it way into the hole and forms threads. While cutting, chips are cut away from the wall of the piece of metal defining the hole; owing to the chip-breaking member, the chips are small; and the chips are transported away in the at least partly helical chip removal flutes. As a result, the thread cutting tap according to the invention is allowed to be utilized at high cutting speeds.

The invention claimed is:

1. A thread cutting tap having an elongated body, the body comprising at a first end thereof a connector portion adapted to be connected to a tool and at a second end thereof a threaded portion for cutting a thread in a surface of a workpiece, said threaded portion being provided with at least two cutting edges extending in the circumferential direction of said body, each of said cutting edges comprising an integral peripheral part of a flank portion of said body and extending substantially radially from the longitudinal extension of said body, said flank portions defining between themselves at least one chip removal flute extending generally in the longitudinal extension of said body for removal of chips, at least one of said flank portions having a side wall forming part of said at least one flute, said at least one flute provided with a chip-breaking member, wherein at least a portion of said at least one flute being helically shaped, and wherein at least a portion of the chip breaking member is located in the portion of the at least one flute that is helically shaped, wherein said side wall, as viewed in a cross section oriented perpendicularly to a longitudinal axis of said elongated body, is divided into a pair of elongated concave surfaces separated by an elongated ridge constituting the chip-breaking member, and wherein the elongated ridge on a trailing, non-cutting surface of the flute comprises an edge formed by the immediate interconnection of said concave surfaces.

2. The thread cutting tap according to claim 1 wherein said at least one flute is coated by a friction reducing coating.

3. The thread cutting tap according to claim 2 wherein said coating contains a nitride.

4. The thread cutting tap according to claim 3 wherein said coating comprises one of: TiCN, TiN, TiAlN, TiAlCN or CrN.

5. The thread cutting tap according to claim 1 wherein said elongated body defines at least one lumen extending from said connector portion to said threaded portion for conducting fluid to said threaded portion.

6. The thread cutting tap according to claim 1 wherein said at least one flute is helically shaped over substantially its whole length.

7. The thread cutting tap according to claim 1 wherein said at least one flute comprises a plurality of flutes.

8. The thread cutting tap according to claim 7 wherein an angle formed between the axial extension of the body and the extension of each of said chip removal flutes is between 10°-50°.

9. The thread cutting tap according to claim 8 wherein said angle is between 10°-25°.

10. The thread cutting tap according to claim 7 wherein said chip removal flutes are partly straight and partly helically shaped, said helically shaped flute parts being arranged closest to the second end.

11. The thread cutting tap according to claim 10 wherein an angle formed between a longitudinal axis of the body and an extension of each of chip removal flutes is between 1°-15°.

12. The thread cutting tap according to claim 1 wherein said chip removal flute is partly straight and partly helically shaped, said helically shaped flute part being arranged closest to the second end.

13. A method of manufacturing a thread cutting tap comprising the steps of:
   A) selecting an elongated blank having an elongated body with a first end portion and a second end portion;
   B) forming in the second end portion of said blank at least one thread having a cutting edge at its circumferential periphery;
   C) forming at least two chip removal flutes traversing said thread, such that a flank portion having a side wall is formed between two neighboring flutes, at least a portion of each flute being of helical shape; and
   D) forming in a side wall of each flank portion at least one chip-breaking members
   wherein step D comprises forming said chip-breaking member as an elongated ridge separating a pair of elongated concave surfaces of the side-wall, and
   wherein said ridge is formed as an edge on a trailing, non-cutting surface of the flute.

14. The method according to claim 13 farther including coating each flute with a friction reducing coating.

15. The method according to claim 13 further including coating each flute with a friction reducing coating containing a nitride.

16. The method according to claim 15 wherein the coating step employs a coating containing one of TiCN, TiN, TiAlN, TiAlCN or CrN.

17. The method according to claim 13 including forming at least one lumen extending from said connector portion to said threaded portion.

18. The method according to claim 13 wherein step C comprises forming chip removal flutes having a helical shape over substantially their whole length.

19. The method according to claim 18 wherein step C comprises forming said chip removal flutes such that an angle formed between an axial extension of the body and an extension of each of said chip removal flutes is between 10°-50°.

20. The method according to claim 19 wherein the angle is between 10°-25°.

21. The method according to claim 13 wherein step C comprises shaping each of said chip removal flutes as partly straight and partly helical, said helical shape being formed closest to a distal end of the second end portion.

22. The method according to claim 21 wherein step C comprises forming said chip removal flutes such that an angle formed between an axial extension of the body and an extension of each of said chip removal flutes is between 1°-15°.

\* \* \* \* \*